6 Sheets—Sheet 1.

M. VIERENGEL.

Assignor to C. B. COTTRELL.

CYLINDER PRINTING MACHINE.

No. 11,228. Reissued Mar. 1, 1892.

Witnesses:
John A. Holden
Anton Habermehl

Inventor:
Matthew Vierengel
per Uhlenhut & Dorsey
Atty

M. VIERENGEL.
Assignor to C. B. COTTRELL.
6 Sheets—Sheet 2.
CYLINDER PRINTING MACHINE.
No. 11,228.
Reissued Mar. 1, 1892.
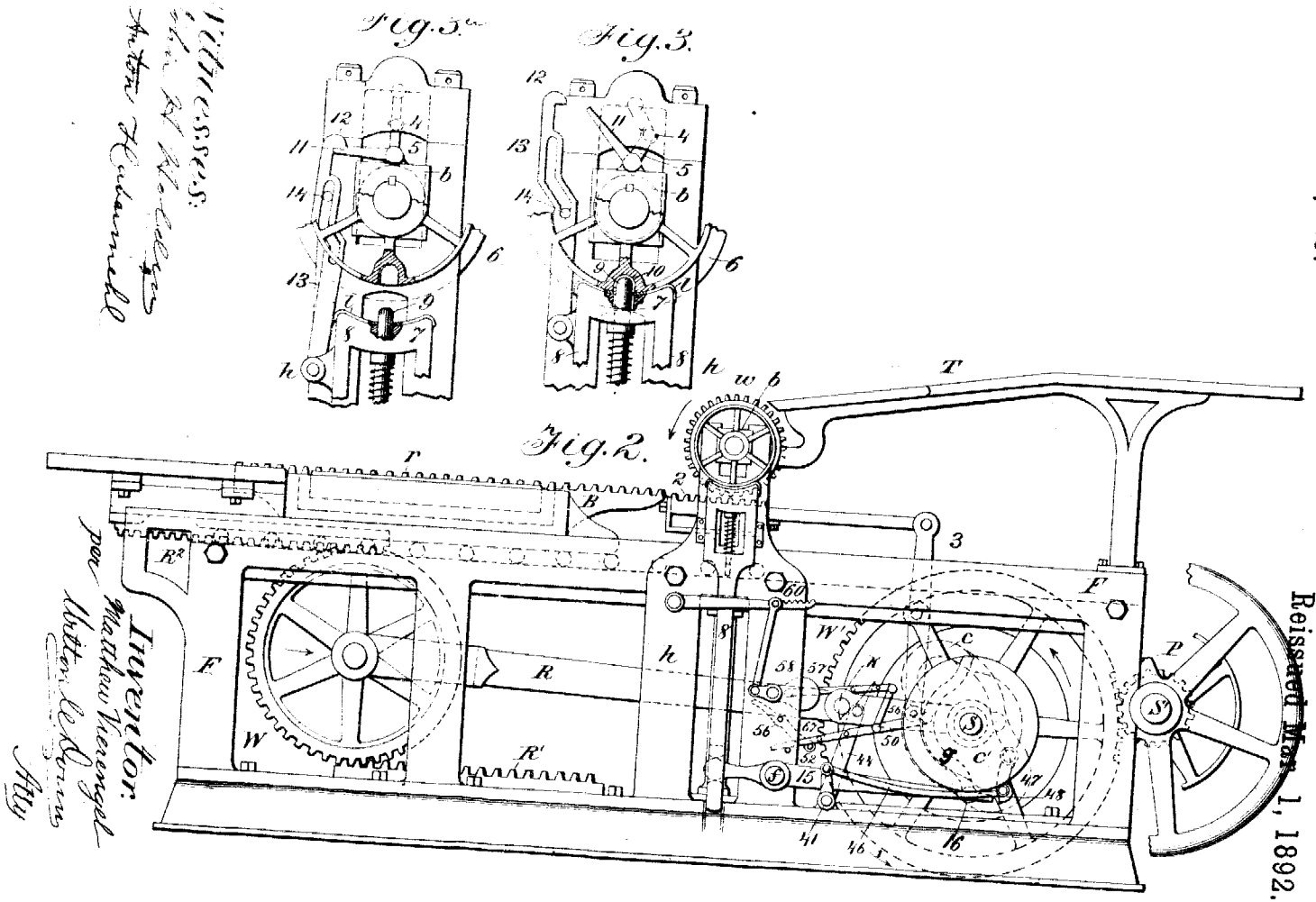
Witnesses:
John H. Holdsen
Anton Habermehl
Inventor:
Matthew Vierengel
per Wilton le Doux
Atty 6 Sheets—Sheet 3.

M. VIERENGEL.

Assignor to C. B. COTTRELL.

CYLINDER PRINTING MACHINE.

No. 11,228. Reissued Mar. 1, 1892.

Witnesses.
John H. Hilden
Anton Habermehl

Inventor.
Matthew Vierengel
per Bretonell Donn
Atty

6 Sheets—Sheet 4.

M. VIERENGEL.

Assignor to C. B. COTTRELL.

CYLINDER PRINTING MACHINE.

No. 11,228. Reissued Mar. 1, 1892.

Witnesses:
John H. Allen
Anton Eberhardt

Inventor:
Matthew Vierengel
per Victor le Doux
Atty

6 Sheets—Sheet 5.

M. VIERENGEL.

Assignor to C. B. COTTRELL.

CYLINDER PRINTING MACHINE.

No. 11,228. Reissued Mar. 1, 1892.

Witnesses:
John H. Holden
Anton Habermehl

Inventor:
Matthew Vierengel
per Abetmale Dorr
Atty

M. VIERENGEL.
Assignor to C. R. COTTRELL.
CYLINDER PRINTING MACHINE.
No. 11,228. Reissued Mar. 1, 1892.
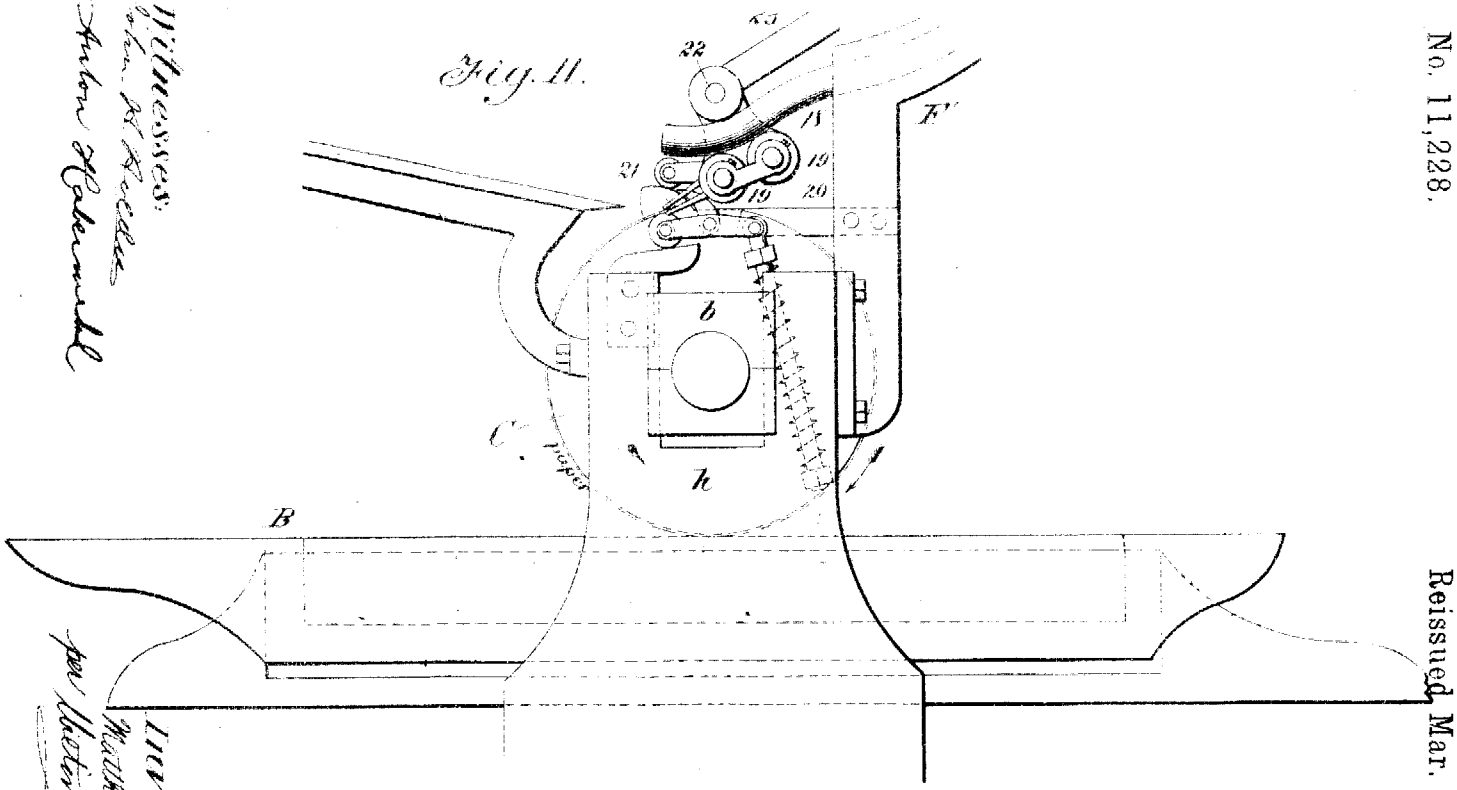

UNITED STATES PATENT OFFICE.

MATTHEW VIERENGEL, OF BROOKLYN, NEW YORK, ASSIGNOR TO CALVERT B. COTTRELL, OF STONINGTON, CONNECTICUT.

CYLINDER PRINTING-MACHINE.

SPECIFICATION forming part of Reissued Letters Patent No. 11,228, dated March 1, 1892.

Original No. 379,188, dated March 6, 1888. Application for reissue filed August 26, 1891. Serial No. 403,800½.

DIVISION B.

*To all whom it may concern:*

Be it known that I, MATTHEW VIERENGEL, of Brooklyn, in the county of Kings and State of New York, have invented a new and useful Cylinder Printing-Machine, of which the following is a specification.

My invention relates to printing-machines of the class known as "stop-cylinder" presses or machines, in which the form-bed carries the type, plate, or stone with a reciprocating motion and the sheet is taken from the feeding-table by a rotary impression-cylinder that carries it against the type, plate, or stone, and at the end of each forward motion of the bed and the completion of each impression is brought to a full stop while the bed is making its backward or return motion.

Figure 1:
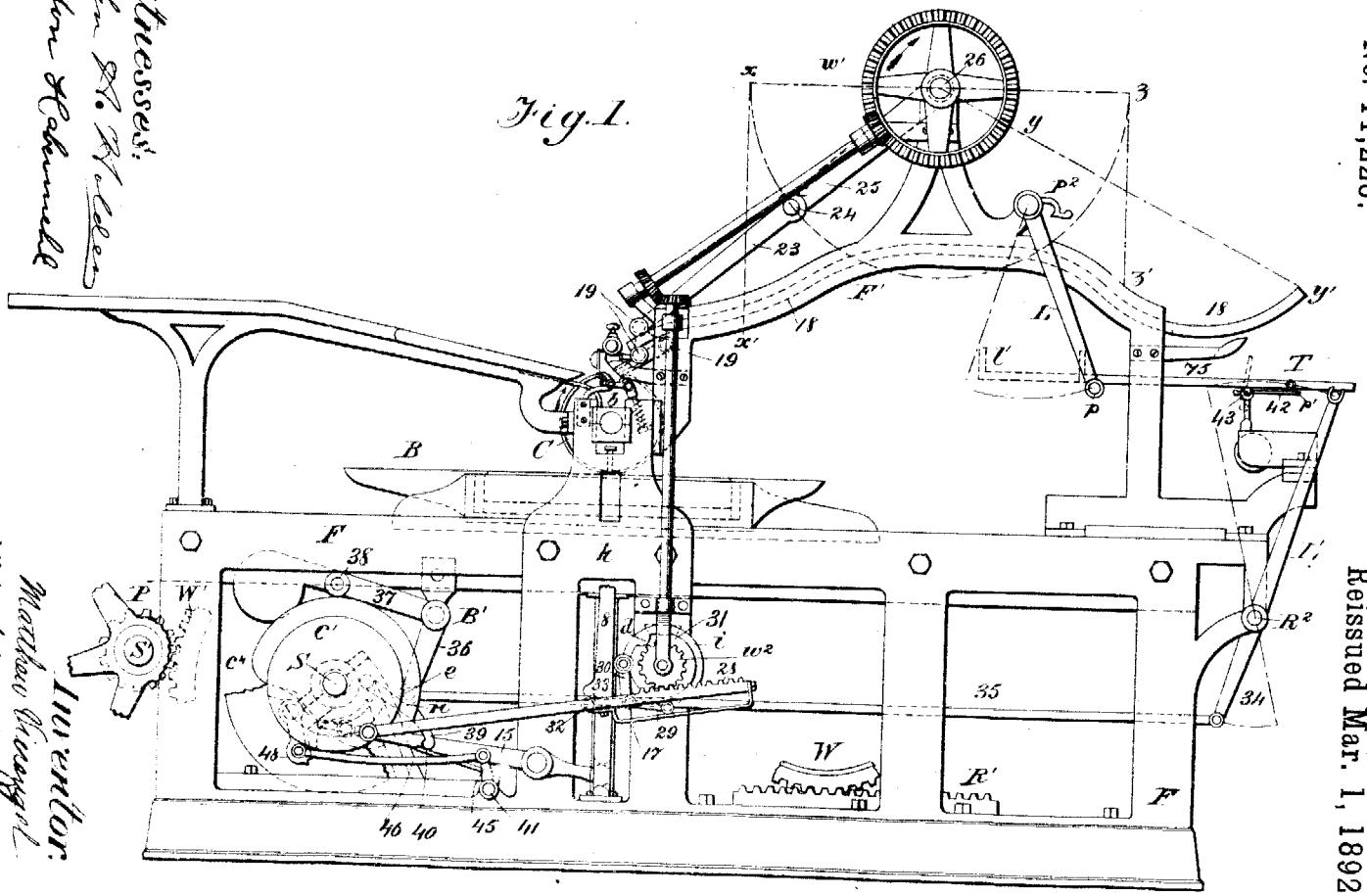
Figure 5:
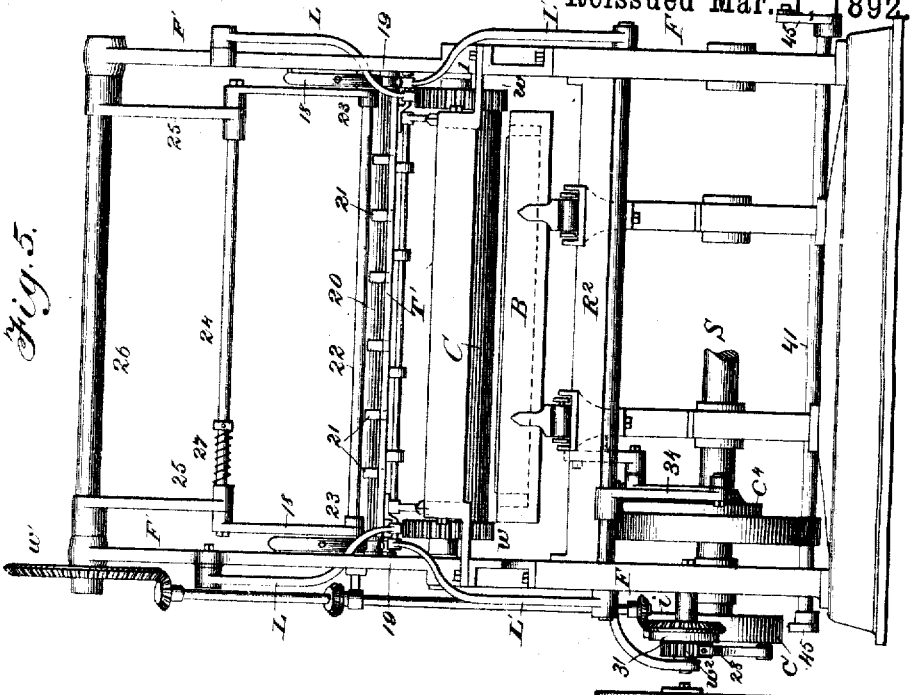
Figure 4:
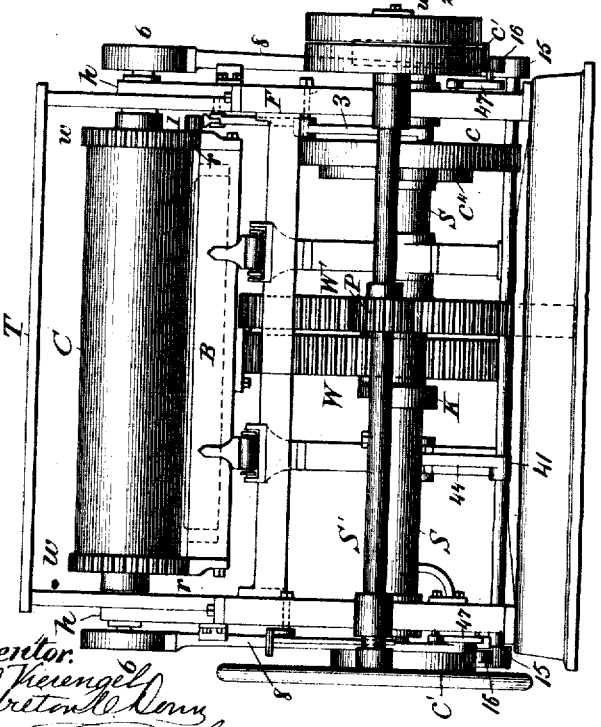
Figure 7:
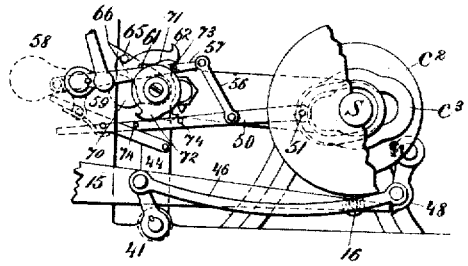
Figure 6:
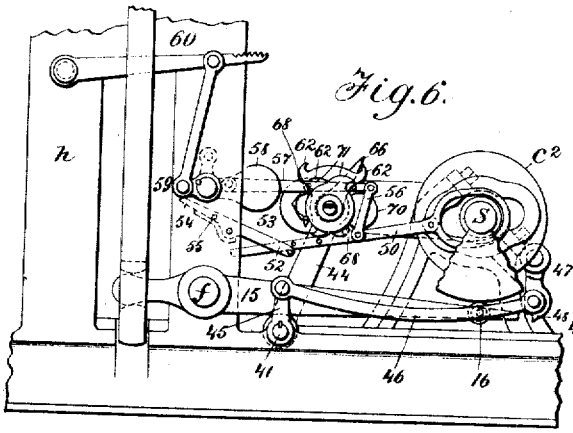
Figure 8:
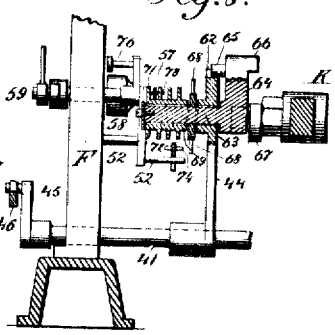
Figure 9:
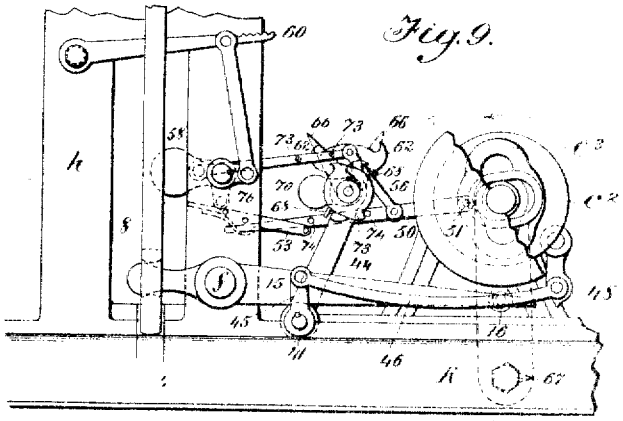
Figure 10:
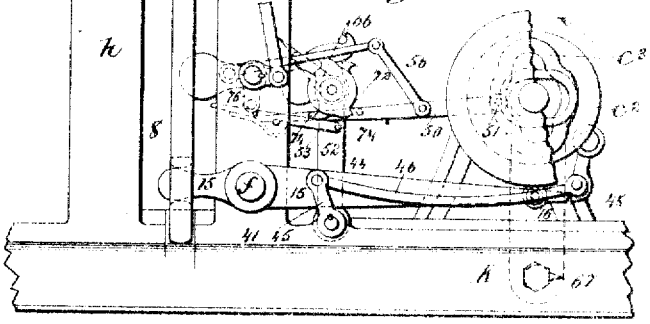

In the accompanying drawings, Figure 1 represents a side elevation of a cylinder printing-machine containing my improvements; Fig. 2, a similar view from the opposite side and without the sheet-delivery mechanism; Figs. 3 and 3ª, detail views, partially in section, of the impression-cylinder and the mechanism for holding it out of its printing position and in its printing position, respectively. Figs. 4 and 5 are respectively rear and front elevations of the machine, as illustrated by Figs. 1 and 2. Figs. 6 and 7 are views in side elevation of the mechanism for putting the impression-cylinder out of gear with the form-bed by means of a treadle, Fig. 6 showing the position of the mechanism before and Fig. 7 after the adjustment is made. Fig. 8 is a sectional detail, and Fig. 8ª a rear elevation enlarged, of the devices by which the mechanism that raises and lowers the cylinder is put in and out of its operative position. Figs. 9 and 10 are similar views to Figs. 6 and 7 of the mechanism by which the cylinder is put out of gear with the form-bed and automatically caused to become inoperative during every alternate reciprocation of the form-bed. Fig. 11 represents an enlarged side elevation of the impression-cylinder, form-bed, and part of the delivery mechanism, showing also the position of the cylinder and the partly-printed sheet at the end of the first revolution of the cylinder.

Referring to the drawings, F represents the frame of the printing-machine; C, the impression-cylinder, the journals of which are supported in suitable bearings in sliding boxes *b*, held in ways in the vertical housings *h h*, rising from the frame of the machine. The ends of the cylinder are fitted with toothed wheels *w w*, that mesh with the side racks *r r* on the form-bed B when the cylinder is in position for making the impression, so that by the backward motion of the bed the cylinder is revolved. The wheel *w* at one end of the cylinder has on its outer rim next to the housing and at a point diametrically opposite to the grippers on the cylinder a toothed segment 1, the teeth of which are coincident with the teeth of the wheel and are in position to be engaged by a short rack-bar 2, placed in suitable supports parallel to the form-bed rack and operated in harmony with but independently of said rack by means of a lever 3, that is pivoted to the frame and has one end pivoted to the rack-bar and the other engaging a cam *c* on the main shaft S.

The form-bed B is reciprocated in the usual manner—that is, by a crank K on the main shaft that connects through a suitable rod R with a large rolling pinion W, meshing with a fixed rack R′ on the bottom of the frame and a rack R² on the under side of the form-bed. The form-bed is provided with suitable rollers which run in suitable ways in the frame of the machine in the usual manner. The main shaft carries a toothed wheel W′ that is in engagement with a pinion P on the driving-shaft S′, that carries a balance-wheel at one end and fast and loose pulleys at the other end. The main shaft S also carries several cams—viz., cam *c*, that gives motion to the rack-bar lever 3, cams *c′ c′* on the ends of said shaft, which are each provided on its inner side with grooves *g*, (one of these grooves being indicated by dotted lines in Fig. 2,) cam *c*², by which is operated the mechanism that automatically locks and unlocks the said levers when it is desired that the cylinder shall not descend, and cam *c*⁴, that gives motion to the rod that moves the receiving-table toward and from the delivery-carriage.

*The impression-cylinder.*—This cylinder is much smaller than has heretofore been used with stop-cylinder presses, being in circumference about the size of the average sheet to be printed. This causes it to produce a much sharper impression than has been possible from the large cylinders heretofore used, and it is started and stopped much more readily, and its comparatively small diameter permits the press to be built lower and shorter and the feeding-table to be fixed much nearer a level than has heretofore been found practicable in this style of press; but the full impression is produced by giving the cylinder two complete revolutions to each impression, as will be more fully described hereinafter. The sliding boxes *b b*, in which the journals of the cylinder are held, are connected on both sides of the press by toggle-joints 4 with the caps of the housing. On the ends of the journals projecting out of the boxes are flat-faced brake-wheels 6 6, under which are the concave bearing-sheets 7 of the heads of the cylinder-lifting rods 8 8, (see Figs. 3, 3ª, and 4,) in such a position relatively to the said wheels that when the rods are thrown up (by the mechanism presently described) the seats bear against the said wheels and lift the cylinder. One or more spring-actuated detents 9 are socketed in the heads and adjusted to engage at the proper time sockets 10, formed in the rim of the wheel 6, so that when the rod bearing the detent is lifted the detent will enter the socket and hold the cylinder as soon as it reaches the stop position—that is, with the grippers in position to take a sheet from the feed-table. To one member 5 of each of the toggle-joints is rigidly secured on both sides of the press a lever or arm 11, that projects toward one edge of the housings and in position to be engaged by hooks 12 on the upper end of bars 13, that are pivotally connected with projections of the rods 8. The bars are provided with guide-slots, into which pins 14, fixed in the housing, project. When the rods 8 are drawn down to permit the cylinder to descend to make an impression, the pins acting against the sides of the slot move the hooks on the bars toward and into engagement with the arms 11 of the toggles, so that as the rods descend the hooks cause the arms to extend the toggles, and thereby when the cylinder reaches its impression portion the toggles are caused to lock it in place. (See Fig. 3ª.) The rods 8 8 are operated by levers 15 15, fulcrumed at *f* in the frame of the press. The short arms of said levers project into mortises in the lower ends of the said rods and the extremity of each of the longer arms is provided with a roller 16, that bears against cams *c′ c′* and enters the cam-groove *g* in said cams when the impression is to be made. The cams keep the long arms of the two levers pressed down, and thereby the rods 8 8 are forced up and the cylinder held in its raised position and locked therein by the detents. When by the motion of the press the form-bed is at the dead-point and begins to pass under the impression-cylinder, the cam-grooves *g* reach a position where the rollers 16 enter the same, and thereby the levers are turned, the rods 8 8 drop, and the cylinder being released descends to the point where it is in position to make the impression, and is locked in that position by the toggles through the engagement and turning of arms 11 by means of the hooks 12, as shown in Fig. 3ª.

The delivery mechanism is connected with a frame F′, erected over the front portion of the machine, so that the form-bed in its forward motion passes under it. To the side plates of the said frame are secured the curved ways or guides 18 18, extending from a point just above the cylinder to the opposite end of the frame, terminating above the receiving table or board. On these ways the rollers 19 19 of the sheet-delivery travel back and forth to carry the sheet from the cylinder to the receiving-table. The sheet-delivery carriage consists of a shaft 20, carrying the said rollers at the ends and supported parallel to the impression-cylinder. On the said shaft are placed grippers 21, operated in the usual manner, that catch the edge of the sheet after the impression-cylinder has made one revolution and half the sheet has received the impression, after which the delivery-carriage commences to move away from the cylinder.

The motion of the delivery mechanism is brought about in the following manner: The shaft 22 is pivotally connected with the arms 23 23, and these arms are fixed to a shaft 24, journaled in the ends of the arms 25 25, which depend from and swing on a shaft 26, mounted in bearings in the upper part of the frame. On the shaft 24 is wound a spring 27, one end of which connects with the end of arm 25 and the other with a collar fixed to said shaft, so that by the swinging of arms 25 the said spring is twisted and thus prepared to react and give motion to arms 23 at a certain point or points of the motion of the delivery mechanism. On one end of shaft 26 is mounted a bevel-wheel *w′*, that by a series of shafts and wheels is in gear with a beveled wheel *i*, placed on a shaft supported in a suitable bearing at the side of the frame of the press, and on the hub of said wheel is keyed a toothed wheel $w^2$, that is in position to be engaged by a rack-bar 28 on a rod that at the opposite end is in connection with a crank-pin on the cam *c′*. By the reciprocating motion given to the said rack-bar by means of the crank the wheel is turned to the right and left alternately, and this motion is communicated through the gearing to the shaft 26 and thence to arms 25 23 and the delivery-carriage. The free end of the rack-bar 28 rests on and is adapted to move upon a roller on one arm 29 of a three-armed lever 17, fixed to a shaft, stud, or pivot adapted to oscillate in a fixed part of the machine. Of the other arms extending from the hub of said lever one 30 carries a roller that bears against the edge of a disk or wheel 31, keyed to the hub of wheel *i*, in which is a notch or depression $d$, and the other 32 projects under a spur 33 of the rod 8. The arm 29 is kept in such a position by means of the wheel 31 bearing against the roller of arm 30 that the rack-bar is held in gear with the toothed wheel $a^2$, and the delivery mechanism consequently is kept in operation while the form-bed is moving; but when the form-bed is running merely to ink the type or stone and it is not desired to operate the cylinder delivery mechanism the roller of arm 30 falls into the notch $d$ when the main crank K arrives at its dead-center, and thus allows the arm 29 to drop, and thereby the rack is put out of gear with the toothed wheel. When the press is running to print and deliver the sheet, the roller of arm 29 is prevented from falling into the notch by the spur 33 on the lifting-rod 8, that, when the rod drops down to allow the cylinder to descend and make an impression, bears upon the arm 32 and thus prevents the roller from entering the notch. Thus it will be seen that when the cylinder makes an impression the delivery mechanism is operated; but when it does not the delivery mechanism remains inoperative.

The receiving table or board T is suspended at its rear end to links L L, that are pivoted by their upper ends to the frame of the delivery mechanism, and its forward end is supported by curved rock-levers L′ L′, fixed to the ends of a transverse rock-shaft $R^2$, so as to oscillate by the motion of the said rock-shaft. An arm 34, projecting downward from said shaft, is pivotally connected with a rod 35, that has its opposite end pivoted to an arm 36 of a bell-crank B′. The other arm 37 of said crank carries a weight and a roller 38, the latter bearing against a cam $c^4$ on main shaft S. By the rotation of the cam the bell-crank arm 37 is raised, and thus causes the other arm 36 to pull the rod 35, whereby the rock-levers are caused to move the receiving-table away from the delivery mechanism after receiving the sheet therefrom. When the depressed face of the cam reaches the roller, the weight causes the arm to fall and thereby turn the bell-crank and move the rod in the opposite direction, thereby oscillating the rock-lever and moving the receiving-table toward the delivery mechanism to receive the sheet therefrom.

To arrest the motion of the receiving-table when the delivery mechanism is inoperative, a detent 39, Fig. 1, is pivoted to the frame in such a position that a notch $n$ formed in it may be caused to engage the pivoted end $e$ of the bell-crank arm 36 and by preventing the bell-crank from swinging on its pivot stop the motion of the receiving-table. The detent is actuated by an arm 40, fixed to the shaft 41. When said shaft is turned to the position shown in Fig. 7, (which occurs when the impression-cylinder is prevented from descending, as will be presently described,) the arm 40 is swung against the detent 39, and lifting the same causes the notch $n$ to engage the pivoted end $e$ of the bell-crank arm 36, and thereby prevent it from giving motion to the receiving-table, as heretofore described. The arm 40 is made in the form of a spring, so that if necessary the detent 39 when supported by the arm may yield sufficiently to allow the pivoted end of the arm 36 to slide into engagement with the detent-notch $n$, after which the spring will press the notch against the said end and keep said parts in engagement with each other.

The receiving-table T is provided with a ledge $l'$ at its inner edge to prevent the sheets from slipping off the table. The outer or free edge is open to permit of easy removal of the printed sheets. To prevent the sheets when deposited on the table from slipping off the front edge of the table, stop-fingers 42, swinging on a shaft 43, are provided. These fingers have weighted ends that turn and maintain them in an upright position by gravity alone when the table is moved back to receive a sheet from the delivery mechanism, as represented by dotted lines in Fig. 1; but when the table is moved forward after receiving the delivered sheet its front edge strikes the fingers and turns them down, so that the table passes over them, as is also shown in Fig. 1.

When the receiving-table is not in use, it can be disconnected from the rock-levers L′ and turned on its pivot $p$, where it connects with the link L and a pin or projection $p'$ on the edge of said table caused to engage a hook $p^2$ on the pivot of the link L and the table be thereby caught and held in a raised position. The connection of the table and the rock-lever, it will be observed, is made by means of pins on the table and U-shaped slots in the upper end of said levers.

The mechanism for arresting the motion of the impression-cylinder, and thus arranging for the movement of the form-bed independently of the cylinder, is shown in Fig. 2 and in detail and in different stages of the operation in Figs. 6 to 10.

Figure 8A:
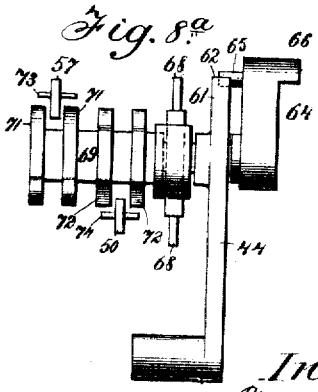

Transversely of the frame of the machine is placed a rock-shaft 41, to which is keyed an arm 44 at a point between the sides of the frame, and on its ends are cranks 45 45, to which are pivoted connecting-rods 46 46, that at the opposite ends are pivoted to detent-links 47, that are in turn pivoted to fixed parts of the frame. The detents 48, forming part of these links, are in line with and close proximity to the ends of the long arms of levers 15, and they can be swung toward the said ends and engage the same, as shown in Figs. 7 and 10, for the purpose of preventing said levers from moving and lowering the cylinder. The means by which this is accomplished will now be described. A rod 50 has one end supported by a yoke on the main shaft S of the machine, and it also carries a roller 51, that engages a cam-groove $c^5$ in a cam-wheel $c^2$, keyed to the main shaft. The other end of said rod is supported on a pin 52, projecting laterally from the adjacent end of a rock-lever 53, fulcrumed on a pivot fixed in the frame of the machine. The opposite end 54 of said lever is jointed and sustained by a spring 55, that permits said jointed end to yield slightly when subjected to pressure. The rod 50 is connected by a link 56 with one end of a rod 57, the opposite end whereof is pivoted to a weight 58 on a crank-arm connected with said weight. The weight is keyed to a short shaft passed through suitable bearings in one of the uprights of the frame. The weight is on the inside end of said shaft. On its outside end it carries a crank 59, which is pivotally connected with the lower end of a treadle-rod, the upper end of said rod being pivoted to a treadle 60. By means of said treadle the weight can be thrown from the position it occupies in Fig. 6, when the impression-cylinder and form-bed are in gear and the machine is printing to the reverse position indicated by dotted lines in Fig. 7 and back again, by which movements the rod 57 is moved longitudinally and thereby adjusts mechanism which will now be described, through which the movement of the impression-cylinder is arrested. On the upper end of the arm 44 is a sector 61, with stops 62 62 at each end. A shaft 63 (see Fig. 8) is passed through an eye or seat in the lever or arm 44, said shaft having a right-angular arm 64, that projects upward parallel to the lever, and has on its rear side a pin 65, that rests against the edge of the sector and is movable between the stops. The arm 64 terminates with a V-shaped right-angular projection 66, that lies in the same vertical plane as a V-shaped finger 67, fixed to the end of the pin of main crank K, so that when the crank rotates the finger will pass on one side or the other of projection 66 of the arm or strike the same and move it one way or the other out of its path, for a purpose that will be described presently. To the shaft 63 are fixed fingers 68, and adjoining these fingers is a sleeve 69, placed loosely on said shaft and having a right-angular extension that carries a weight 70 in the plane of said fingers. (See Figs. 8 and 8a.) The sleeve also has projecting from its upper side two hooks 71 71, turned in opposite directions and from its lower side two similar hooks 72 72. Hooks 71 are in position to be engaged by one or the other of the pins 73, projecting from opposite sides of the rod 57, and hooks 72 by one or the other of similar pins 74, projecting from the rod 50, the object being in one case to turn the collar in one direction or the other by means of the pins on said rod 57 when the weight is shifted by the treadle and in the other case to turn the collar by the pins on said rod 50 alternately back and forth by means of the motion given to said rod by the cam $c^2$. The object of this latter arrangement is to alternately put the cylinder raising and lowering mechanism in and out of gear, and thus make every other reciprocation of the form-bed without lowering the impression-cylinder.

The operation of the machine is as follows: The mechanism being in the positions partly shown in Fig. 2—that is, with all the parts in their operative position, ready for printing and delivering a sheet when fed to the grippers of the impression-cylinder—the machine is put in motion by the crank revolving in the direction of its arrow $l$, the crank draws the pinion $w$ in the direction of its arrow, and thereby moves the form-bed, carrying the the type, stone, or plate toward the cylinder. As soon as this motion commences, the rollers 16 on rock-levers 15 enter the cam-grooves $g$, and the short arms of the levers being thereby depressed the rods 8 8 are lowered and the cylinder descends and the detent 9 is withdrawn from the socket, the cylinder being thereby released. Simultaneously the cam $c$ operates upon the arm of lever 3, turning the said lever and moving the rack 2 toward the rear end of the press and turning the cylinder, the grips of which are immediately at the commencement of the motion caused to take the sheet from the feed-table T. The rack continues to turn the cylinder until the form-bed racks reach the toothed wheels of the cylinder, and engaging the same turn the cylinder in harmony with the movement of the form-bed. The cylinder makes one revolution, and when this is completed its grips release the sheet, which is seized by the grips of the delivery mechanism, which begins to move forward and away from the cylinder to take the sheet off the cylinder. (See Figs. 1 and 11.) The cylinder continues to revolve and impress the sheet against the type, stone, or plate, during which the delivery-carriage is moving away from the cylinder, and thus completes a second revolution, at the end of which the sheet has passed from between the impression-cylinder and the form, and the delivery mechanism has continued to draw it away from the cylinder and toward the receiving-table. At about the completion of the first revolution of the cylinder when the front edge of the sheet is about to be released by the cylinder-grippers and caught by the delivery-grippers, the rod of rack 28, being in the position shown in Fig. 1, is moved by its crank and thereby through the gearing turns the wheel $w'$ in the direction of its arrow and swings the arms 23 25 to the positions indicated by dotted lines $x$ $x'$, thereby winding up the spring 27, so that by the momentum of the delivery-carriage and the reaction of the spring the arm 23 is caused to swing on its pivotal bearings forward and away from the cylinder, thereby carrying the said arms and delivery-carriage past the dead-center, by which time the crank has reached the point where it reverses the motion of the rack 28, and thereby the wheel $w'$ is caused to reverse its motion, thus carrying arms 23 25 to the points indicated by the dotted lines $y$ $y'$, the delivery-carriage being thereby carried to the end of its motion, during which, when over the receiving-table T', the grippers 21 were released by striking against the fixed finger 75 and the sheet let fall on the receiving-table, the wheel $w'$ in the meanwhile having continued to revolve until the arms 23 25 have reached the positions indicated by the dotted lines $z$ $z'$, thus again contracting the spring, which at this point is permitted to react and swing arm 23 backward past the dead-center, whereupon the delivery-carriage is returned to its first position in time to take a fresh sheet from the cylinder. While the delivery-carriage was moving away from the cylinder with the printed sheet the cam $c^4$ reached a point where the bell-crank was permitted to turn and move the connecting-rod, thereby the receiving-table was moved toward the approaching delivery-carriage and the printed sheet, after receiving which, the cam continuing to rotate, the depressed face of the cam reaches the roller 38, and the weight forcing it down the bell-crank turned in a reverse direction thereby through the connecting-rod and levers moving the receiving-table forward, the front edge acting on the fingers 42, turn the same down to the position shown in Fig. 1, thus leaving the front of the table clear for the removal of the sheet. By this arrangement the receiving-table moves backward to take the sheet from the delivery-carriage, and the latter is not required to move beyond the end of the press-frame to deliver the sheet, whereby the press can be built much shorter. When the cylinder completes its second revolution, as heretofore stated, the rollers 16 of rock-levers 15 pass out of cam-groove $g$ to the face of the cam $c'$, thus operating said lever and raising its short arm, whereby rods 8 8 are lifted, and the concave seats of said rods, being pressed against the peripheries of wheels 6 6, act as brakes to stop the motion of the cylinder, which is at the same time lifted and the detent 9 pressed into the sockets in the wheel, thereby holding the cylinder steady. This takes place when the form-bed reaches the end of its backward motion, during which the sheet is imprinted, so that when it commences its return motion the cylinder is clear of the type, stone, or plate.

If it is desired to reciprocate the form-bed without operating the cylinder for the purpose of thoroughly distributing the ink or otherwise, it can be done in the following manner: The feeder presses his foot on the treadle 60 with a sudden jerk, thus throwing the weight 58 over from the position it occupies in Figs. 2 and 6 to that shown in Fig. 7. Thereby the rod 57 is pulled longitudinally, and by this movement the link 56, being thrown past its center, allows the rod to drop, so that one of its pins engages one of the hooks 71 and turns the collar 69, and that in turn rotates the weight 70, that striking one of the fingers 68 turns the shaft 63 and moves the pin 65 against one of the stops 62 of the sector 61. This does not move the arm 44, but it puts the V-shaped projection 66 of said arm 64 in such a position that the finger 67 of the main crank will strike the said end and move it together with the arm 44 to the left. The arm turns the shaft and the crank and swings the detent-links 47, so that the notched detents 48 are caused to bear against the adjacent ends of the rock-levers, as shown in Fig. 7, and thus hold said levers immovable. Now when the cam-grooves $g$ $g$ reach the rollers 16 on said rock-levers they do not enter the same and the levers hold the rods up and prevent the cylinder from descending. When it is desired to operate the cylinder, the treadle is pressed down, thus reversing the weight and moving the rod 57 back, so that one of its pins 73, engaging the adjacent oppositely-turned hook 71, swings the weight and through that the finger to the right and against the stops 62 of the sector, whereby the finger 67 of the crank is caused to strike it and move the arm 44 to the right, as in Fig. 6, and thus through the crank 45 and rod 46 throw the detent 48 out of engagement with the end of the rock-lever, and thereby permit said lever to operate the cylinder in the manner heretofore described. In some instances it may be desired to allow the cylinder to descend at every alternate movement of the form-bed only. For this purpose the rod 50 and lever 53 are employed in connection with a cam 76 on the shaft of weight 58, that is movable in and out of the plane of lever 53 by pushing it through its seat in the arm until it rests in the plain of the lever 53. (See Figs. 8, 9, and 10.) When the weight is swung over to the position it occupies in Fig. 9 by means of the treadle, as heretofore described, the cam turns the lever 53 and raises the rod 50, so that its pins 74 are respectively in position for engaging the oppositely-turned hooks 72 of the collar 69. By this movement link 56 is caused to raise the end of rod 57 high enough for its pins to pass over the hooks 71 when it is reciprocated. The rod 50 receives a reciprocating motion from the cam $c^2$, acting against the roller 51 on said rod. By this motion the pins 74 are caused to engage the hooks and oscillate the collar 69, thereby swinging the weight from side to side and turning the pin 65 against the two stops of the sector alternately. The normal position of the arm 44 is shown in Fig. 9. The lever being now allowed to lower and raise the cylinder, the corresponding position of the V-shaped end 66 of the arm is represented by dotted lines. During one revolution of the crank K the said parts remain in the above position. At the following revolution the cam draws the rod 50 toward it, whereupon the pin 74 engages the adjacent hooks 72, and swinging the weight over to the left moves the pin 65 against the stop 62, as shown in full lines in the said figure. This motion takes place a little in advance of the arrival of the crank in proximity to the V-shaped projection of the arm 64, so that it strikes said end, and thereby moves arm 44 to the position shown in Fig. 10, thereby locking rock-levers 15 15 and preventing the descent of the cylinder. The form-bed now makes one reciprocation, at the end of which the cam $c^2$ is in position to push the rod 50 away from it, and thereby cause its pin 74 to engage hook 72 and move the weight and through that and the finger 68 turn the projection 66 in position for the crank to move arm 64, and thereby release the rock-lever from the detent.

The object of having the segment 61 and rack-bar 2 in addition to the rack on the form-bed is to afford space in which to lower the cylinder before the bed reaches it and to turn it so that the grippers, with the head of the sheet, will reach the level of the type, plate, or stone in time for the head to receive the impression as soon as the type, plate, or stone passes under the cylinder.

I claim—

1. The combination, with an impression-cylinder and mechanism, substantially as described, for moving it vertically to place it in and out of contact with the type or stone and with the main crank of the machine provided with a V-shaped finger, of devices, substantially as described, for locking the said mechanism and retaining the cylinder out of gear with the form-bed, a rock-lever for actuating said locking devices provided with two lugs, an arm provided with a pin that is movable by suitable means into contact with either of the said lugs and with a V-shaped projection that is movable into and out of the path of the finger of the main crank, whereby when the said arm is oscillated, so that its pin is carried in contact with one of the lugs, its V-shaped projection is struck by the finger of the main crank, thereby causing to move the rock-lever, which puts the locking devices into and out of engagement with the mechanism that controls the vertical movement of the cylinder, substantially as specified.

2. The combination, with an impression-cylinder and rods and levers and cams by which the same is lowered and raised and the main crank K, provided with a V-shaped finger 67, of mechanism interposed between the said main crank and the levers and consisting of the following devices or substantially the same, viz: the detents 48, rods 46, cranks 45, detent-actuating lever 44, provided with a sector having lugs 62 at each end thereof, arm 64, provided with a pin 65, projecting between the lugs of the sector and movable in contact with either, and a V-shaped projection 66, that is movable into the path of the crank-finger 67, fingers 68, fixed to the shaft of arm 64, a sleeve placed loosely on said arm and provided with hooks 71 and a weight 70, that is held between the fingers 68, a rod 57, provided with pins 73, and suitable means for moving said rod and causing the pins thereon to engage the hooks 71 for the purpose of causing the weight 70 to move against one of the fingers 68 and thereby oscillate the arm, so that its V-shaped end 66 will be moved into the path of the finger 67 of the crank K, for the purpose herein specified.

3. The combination, with an impression-cylinder and mechanism, substantially as described, for moving it vertically to place it in and out of contact with the type or stone and with the main crank of the machine provided with a V-shaped finger, of devices for locking the said mechanism and retaining the cylinder out of gear with the form, a rock-lever for actuating said locking devices, provided with two lugs, an arm provided with a pin that is movable into contact with either of the said lugs and with a V-shaped projection that is movable into and out of the path of the finger of the main crank, a cam on the main shaft, and mechanism by which the said cam is placed in connection with the arm at will, whereby the locking devices are caused to engage the mechanism by which the vertical movement of the cylinder is controlled at each alternate movement of the form-bed, substantially as specified.

4. The combination, with an impression-cylinder and the rods, levers, and cams by which the same is lowered and raised and with the main crank P′, provided with a finger 67, of mechanism interposed between the main crank and the said levers for controlling the vertical movement of the cylinder and consisting, substantially, of the following devices, viz: the detents 48, rods 46, cranks 45, detent-actuating rock-lever 44, provided with a sector having lugs 62 at each end thereof, arm 64, provided with a pin 65, projecting between the lugs of the sector and movable in contact with either, and a V-shaped projection 66, that is movable into the path of the crank-finger 67, fingers 68, fixed to the shaft of arm 64, a sleeve placed loosely on said arm and provided with hooks 72 and a weight 70, that is held between the fingers 68, a rod 50, provided with pins 74, means, substantially as described, for placing said pins in position to engage hooks 72, and a cam $c^2$, by which the rod 50 is moved and the pins 74 caused to engage the hooks 72 for the purpose of moving the arm 64 into and out of the path of the crank-finger, substantially as specified.

5. The combination, with a reciprocating form-bed and a revolving impression-cylinder, of an arched frame F, erected over the front of the machine and provided with ways 18, a delivery-carriage provided with a suitable gripper, and mechanism, substantially as described, for causing the said carriage to travel back and forth on said ways, and a receiving-table constructed and arranged to move toward the delivery-carriage when the latter takes a sheet from the cylinder and away from the same after receiving the sheet, substantially as specified.

6. In a front sheet-delivery mechanism for printing-machines, the combination, with the delivery-carriage and suitable ways on which the same is reciprocally movable, of arms 23

25, shaft 24, spring 27, shaft 26, and suitable mechanism for giving reversible rotary motion to shaft 26, substantially as specified.

7. The combination, with a front sheet-delivery carriage and suitable ways on which the same is reciprocally movable, of arms 23 25, shaft 24, spring 27, shaft 26, and rack 28, reciprocally movable by means of a crank, and gearing by which the motion of the said rod is communicated to the shaft 26, substantially as specified.

8. In combination with the rack 28, a three-arm crank, a lug 33 on the rod 8, and notched wheel 31, connected with the gear-wheel $w^2$, whereby when the cylinder is lifted and held out of contact with the type or stone the delivery mechanism is caused to become inoperative, substantially as specified.

9. In combination with a front sheet-delivery carriage, a receiving-table having a reciprocating motion by which it is caused to move back under the sheet-delivery carriage as the latter moves forward and forward again when said carriage moves back, and suitable mechanism for communicating the said reciprocating motion to the table in harmony with the motion of the delivery-carriage, substantially as specified.

10. The combination, with an impression-cylinder, of sheet-delivery mechanism, a receiving-table T′, swinging arms that support said table, cam $c^1$, and connecting-rod 35, substantially as specified.

11. The combination, with an impression-cylinder, of cam-actuated levers 15, rods through which the said levers are caused to raise and lower the cylinder-detents 48, adapted to engage said levers, mechanism, substantially as described, for actuating the said detents, the arm 40, a reciprocating table, a bell-crank lever B′, rod 35, and a detent 39, adapted to engage said lever B′, the construction being such that when the cylinder is thrown out of gear with the form-bed and the delivery mechanism ceases to act the receiving-table is also caused to stop moving, thus leaving the space under the delivery mechanism clear and unobstructed, substantially as specified.

12. The combination, with an impression-cylinder, of a sheet-delivery carriage and suitable ways for said carriage, a gear-wheel $w'$, arms 23 25, spring 27, secured to one of said arms and shaft 24, an oscillating rack-bar 28, and mechanism interposed between said rack-bar and wheel $w'$ for the purpose of imparting an oscillating rotary motion to said wheel $w'$, substantially as specified.

13. In a printing-press, the combination, with a sheet-delivery carriage and suitable ways on which said carriage moves, of a shaft 26, arms 23 25, a shaft 24, to which the arms 23 are keyed, said shaft turning in bearings in the arms 25, and a spring 27, coiled on said shaft, substantially as specified.

14. The combination, with an impression-cylinder, of a cam-actuated lever 15, made to raise and lower said cylinder, a reciprocating delivery-table T′, and a bell-crank lever B′, that reciprocates said table, detents 39, adapted to engage said lever B′, and suitable mechanism, substantially as described, for actuating said detents, substantially as specified.

In testimony that I claim the foregoing as my invention I have subscribed my name hereto this 19th day of March 18, 1891.

MATTHEW VIERENGEL.

Witnesses:

FREDK. HAYNES,

ANTON HABERMEHL.

Correction in Reissued Letters Patent No. 11,228.

It is hereby certified that Reissued Letters Patent No. 11,228, granted March 1, 1892, upon the application of Matthew Vierengel, of Brooklyn, New York, for an improvement in "Cylinder Printing-Machines," was erroneously issued to Calvert B. Cottrell, as assignee of said invention; that said Letters Patent should have been issued to said *Matthew Vierengel*, as owner of the entire interest in said invention as shown by the assignments of record in this office; and that said Letters Patent should be read with this correction therein that the same may conform to the record of the case in the Patent Office.

Signed, countersigned, and sealed this 15th day of March, A. D. 1892.

[SEAL.]

CYRUS BUSSEY,
*Assistant Secretary of the Interior.*

Countersigned:

W. E. SIMONDS,
*Commissioner of Patents.*